Sept. 3, 1946.    L. C. HUCK    2,406,949
RIVETING GUN
Filed July 31, 1941    2 Sheets-Sheet 1
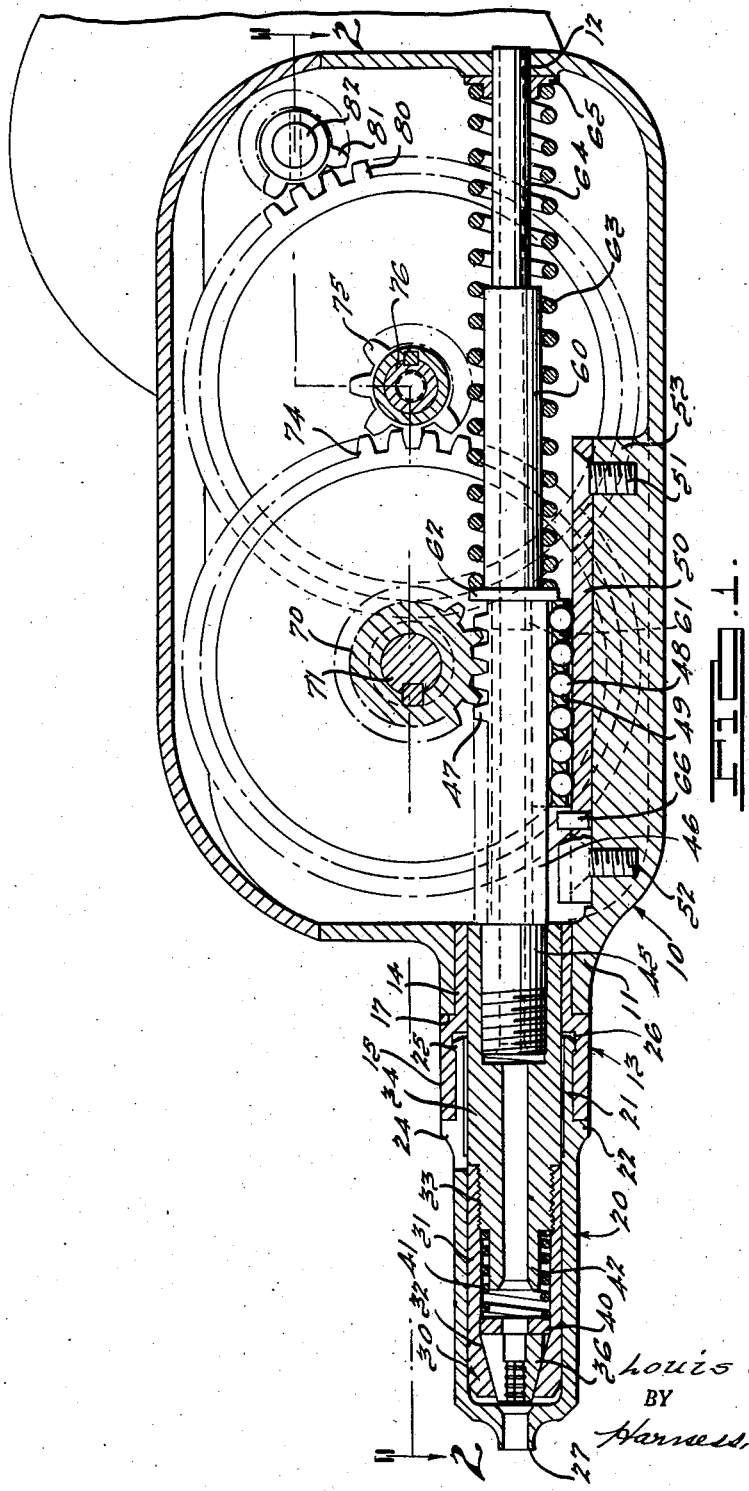
INVENTOR.
Louis C. Huck.
BY
Harness, Dickey & Pierce
ATTORNEYS.

Sept. 3, 1946.   L. C. HUCK   2,406,949
RIVETING GUN
Filed July 31, 1944   2 Sheets-Sheet 2
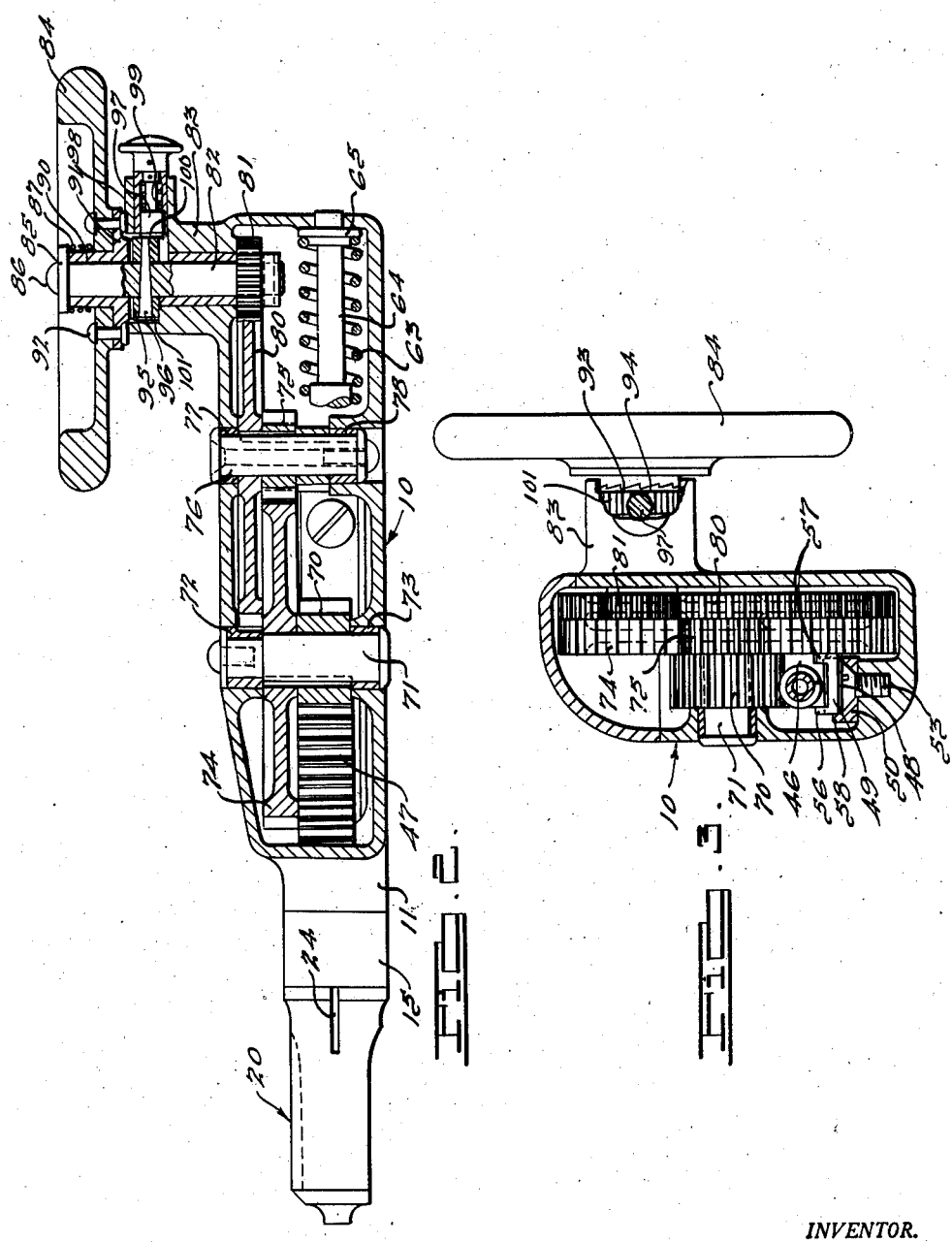
INVENTOR.
Louis C. Huck.
BY
Harness, Dickey & Pierce
ATTORNEYS.

Patented Sept. 3, 1946

2,406,949

UNITED STATES PATENT OFFICE 2,406,949

RIVETING GUN

Louis C. Huck, Grosse Pointe, Mich., assignor to Huxon Holding Corporation, Detroit, Mich., a corporation of Michigan Application July 31, 1944, Serial No. 547,397

10 Claims. (Cl. 218—19)

The invention relates to riveting mechanisms, and it has particular relation to a mechanism for setting a two-part rivet adapted to be inserted and set from one side of the structure to be riveted.

In this type of rivet, a tubular member is provided having a pin projecting therethrough, and the rivet is set by pulling the pin and applying the reaction force against a head on the end of the tubular member. This causes a head to form on the other end of the tubular member so as to effect riveting of the structure. Rivets of this general character have been used in large numbers on aircraft, and usually in the manufacturing plant a fluid pressure operated mechanism is used for setting the rivet. While this mechanism is satisfactory, it is desirable also to have a simple form of mechanism for setting such rivets in locations where it is impractical or perhaps undesirable to use fluid pressure operated mechanisms. For instance, if an airplane engaged in war activities is damaged, it frequently is necessary to make repairs and to use rivets of the type mentioned for effecting these repairs. In many instances, it may be necessary to make these repairs where perhaps fluid pressure would not be readily available or where too much time would be required to obtain a fluid operated mechanism.

One object of the present invention is to provide a manually operated and manually energized riveting mechanism which would be readily available for setting the rivets and especially for setting rivets in repair work on airplane structures.

Another object of the invention is to provide a manually operated and manually energized riveting mechanism for setting rivets of the type designated which is simple in its operation, durable, compact, and light in weight so as to facilitate handling and use of the mechanism.

Another object of this invention is to provide a mechanism of this character which requires only a small manual force for its operation so that the rivets may be set without difficulty.

Another object of the invention is to provide a mechanism of this type which may be readily carried and stored so that one of the mechanisms can be carried either with the airplane, or, at least, be easily secured.

Other objects of the invention will become apparent from the following description, from the drawings to which it relates, and from the claims hereinafter set forth.

For a better understanding of the invention reference may be had to the accompanying drawings wherein:

Figure 1 is a cross-sectional view illustrating a riveting mechanism constructed according to one form of the invention;

Figure 2 is a cross-sectional view taken substantially along the line 2—2 of Figure 1; and Figure 3 is an end view of the construction as seen from the right end in Figure 2, with certain parts broken away for the purpose of illustration.

Referring to Figure 1, the mechanism comprises a main casing 10 generally of elongated, rectangular shape having a short tubular projection 11 at one end and a small opening 12 in its opposite end wall which is aligned with the projection. A sleeve 13 is connected to the projection 11 and has a smaller portion 14 which may be threaded into or otherwise fitted in the projection, a larger portion 15 extending beyond the projection and an annular shoulder 17 engaging the end of the projection. Beyond the larger portion 15 of the sleeve, a barrel 20 is provided, and this barrel has an end portion 21 fitting within the portion 15 of the sleeve and a shoulder 22 fitting against the end of such portion. At one or more points, the inner portion of the barrel 20 is axially slotted as indicated at 24 so as to enable springing the end of the barrel into the end portion 15 of the sleeve, and for retaining the two parts assembled after such insertion, the inner end of the barrel has a slight and beveled flange 25 which snaps outwardly into an annular groove 26 in the inner wall of the sleeve.

At its outer end, the barrel has a nose or anvil 27 which is adapted to engage the preformed head on the tubular part of the rivet. A rivet such as shown in my copending application for patent, Serial No. 536,271, filed May 19, 1944, may, for instance, be set by using the mechanism and the anvil 27 on the barrel would in that case engage the pre-formed head 17 on the tubular member. It is evident that the anvil 27 may vary in shape if found desirable and, for instance, may be flat to contact a flat head on the tubular portion, or it may be concave so as to fit a brazier rivet head.

Within the barrel 20 a jaw contracting member 30 is provided, and this comprises a cylindrical sleeve 31 having a conical jaw receiving bore 32 in its end next to the anvil 27. The other end of this member, as indicated at 33, is threaded onto a reciprocatory rod 34 slidable in the sleeve 13. Within the jaw contracting member, a plurality of jaws 36 are provided which are in contact with the surface of bore 32. At the right end of the jaws, a jaw follower 40 is provided and this is pressed against the ends of the jaws by a coil spring 41 which encircles a smaller end portion 42 of the member 34 and urges the jaws towards the left end of the member 30 so as to contract them in a radial direction. The jaws, jaw follower and spring may substantially correspond to similar parts such as shown in Huck Patent No. 2,053,717, and the inner surfaces of the jaws may have circumferentially extending grooves for engaging a similarly grooved end on the rivet pin.

Generally, setting of the rivet would occur in substantially the same manner as set forth in the patent mentioned, and it seems only necessary to mention the procedure briefly here. The rivet is inserted in the work to be riveted and the barrel of the mechanism is moved over the rivet pin so that the pin extends through the anvil and between the jaws. As the pin enters the jaws, it may spread them slightly and at the same time move them slightly rearwardly against the action of the spring so that finally when the pin is in position the spring moves the jaws into gripping relation with the pin. Instead of this procedure, the rivet may first be applied to the mechanism by moving the rivet pin inwardly between the jaws and then moving the mechanism to place the rivet in the work. When the member 34 thereafter is pulled the jaws are first caused to forcefully grip the pin and then the pin is pulled or moved with the member. During this action the reaction to the pull is applied through the anvil 27 to the head on the tubular member. After the rivet is set, an increase in tension on the pin breaks it and the broken part moves on rearwardly through the member 34.

At its right end the reciprocatory member 34 is connected to a tubular rod 45 which is threaded thereinto, and this rod, within the casing proper, has a generally rectangular portion 46 provided with rack teeth 47 on one side. At that side of the portion 46 opposite the rack teeth 47, roller bearings 48 are provided, and these are disposed in openings formed in a retaining plate 49. A bearing plate 50 supports the rollers at that side opposite the rack portion 46, and this plate is secured by screws 51 and 52 to a thickened portion 53 of the casing wall. As best shown by Fig. 3, the bearing retainer plate 49 has upwardly projecting guide flanges 56 and 57 straddling the rack portion 46 at its lower side, and the openings in the plate for the rollers 48 open only to the left side. With the rollers located in the openings and the parts in place, removal of the rollers is prevented by a flange 58 on the bearing plate 50.

Directing attention again to Fig. 1, the member 45 at the right end of the rack portion 46 is connected to a rod 60 which may be threaded into the end of the rack portion as indicated at 61. This rod has a collar 62 abutting the end of the rack portion and which also serves as an abutment for one end of a coil spring 63 disposed on the rod. The rod includes a smaller portion 64 projecting through the opening 12 in the casing wall, and the spring 63 encircles this smaller portion and abuts a spring seat 65 located against the wall of the casing.

Movement of the roller retaining plate 49 is limited at one end by a rivet pin 66 projecting upwardly from the bearing plate 50, and movement in the opposite direction is limited by the collar 62 on the rod 60. These two limiting means insure that the rollers will at all times be in a position opposite the rack so as to take side loads imparted against the rack.

For moving the rack portion 46 so as to pull the rivet pin, a pinion 70 engages the rack teeth, and this pinion is keyed to a shaft 71 which is journaled in bearings 72 and 73 in opposite side walls of the casing as seen in Fig. 2. A large gear 74 is also keyed to the shaft 71, and this gear meshes with a small pinion 75 which is keyed to a shaft 76 journaled in bearings 77 and 78 in the casing side walls as also shown by Fig. 2. A second large gear 80, keyed to the shaft 76, meshes with a pinion 81 which is secured to a hand-wheel shaft 82 journaled in a tubular projection 83 forming part of the casing.

For turning the shaft 82 a handwheel 84 is provided on its outer end outside the casing, and while the handwheel is not keyed to the shaft, it is normally retained thereon against removal by a washer 85 and a screw or the like 86. A spring 87 inwardly of the washer 85 normally urges the handwheel 84 inwardly, but it is apparent that the wheel may be manually pulled outwardly against the action of the spring. A bearing bushing 90 supports the handwheel on the shaft, and this bushing has a flange 91 at the inner side of the wheel which is secured to the latter by rivets 92. This flange, as best seen by Fig. 3, has circumferentially spaced ratchet teeth 93, and these are engageable with similar ratchet teeth 94 formed on a collar 95, best shown by Fig. 2, which is secured to the shaft 82 by a pin 96. It should now be evident that the ratchet teeth are urged into engaging relation by the spring 87, but that the wheel may be reversely turned so that the teeth 93 ride idly over the teeth 94. Accordingly, the handwheel may be turned continually in one direction, or it may be turned by back-and-forth movements so as to drive the shaft by increments.

In order to prevent reverse movement of the rivet pin pulling means and hence reverse turning of the pinions and gears by the spring 63, a releasable locking device is provided adjacent the handwheel 84, and this operates to hold the shaft 82 against reverse movement. This locking means comprises a plunger 97 slidable in a tubular projection 98 adjacent the handwheel 84, and this plunger is normally urged inwardly towards the collar 95 by a spring 99. At its inner end the plunger has a suitable tooth or dog portion 100 engageable with circumferentially spaced teeth 101 on the collar. The teeth are of such character that reverse movement of the shaft 82 is prevented while permitting forward movement of the shaft as required during setting of the rivet, but at any time, however, the plunger 97 may be pulled outwardly so as to free the shaft 82 for reverse movement.

In operating the mechanism described, the nose of the gun is pushed over the projecting rivet pin until the latter is disposed between the jaws, and the anvil engages the head on the tubular rivet member. Then the handwheel 84 is turned, and usually it will be found easier to turn the wheel back and forth so as to turn the shaft 82 by increments. Turning of the shaft 82 causes the gears and pinions to turn and the rack to move so that the rivet pin is pulled. After the pin is pulled sufficiently to set the rivet, continued turning will break the pin and the broken-off part will move rearwardly through the member 34, rack portion 46, etc. Then the operator, by pulling the plunger 97 outwardly, can release the turnable parts for reverse movement, and the compressed spring 63 will return the parts to their original positions.

While only one form of the invention has been illustrated and described in detail, it will be apparent to those skilled in the art that various modifications may be made without departing from the scope of the appended claims.

What is claimed is:

1. A mechanism for relatively moving a tubular element and a pin element extending through it, comprising a casing, an anvil on the casing for applying reaction forces to the tubular element, means engageable with the pin for pulling it, a rack connected to said means, a pinion engaging the rack, resilient means opposing rivet pulling movement of the rack, hand-operated means for turning the pinion and releasable means for normally preventing reverse turning of the pinion.

2. A mechanism for relatively moving a tubular element and a pin element extending through it, comprising a casing, an anvil on the casing for applying reaction forces to the tubular element, means engageable with the pin for pulling it, a rack connected to said means, a pinion engaging the rack, resilient means opposing rivet pulling movement of the rack, means for turning the pinion including a handwheel externally of the casing, and releasable means for normally preventing reverse turning of the pinion.

3. A mechanism for relatively moving a tubular element and a pin element extending through it, comprising a casing, an anvil on the casing for applying reaction forces to the tubular element, means engageable with the pin for pulling it, a rack connected to said means, a pinion engaging the rack, resilient means opposing rivet pulling movement of the rack, means for turning the pinion including a shaft and a handwheel externally of the casing, and means connecting the wheel to the shaft so that the wheel can be reversely turned independently of the shaft.

4. A mechanism for relatively moving a tubular element and a pin element extending through it, comprising a casing, an anvil on the casing for applying reaction forces to the tubular element, means engageable with the pin for pulling it, a rack connected to said means, a pinion engaging the rack, resilient means opposing rivet pulling movement of the rack, means for turning the pinion including a shaft and a handwheel externally of the casing, means connecting the wheel to the shaft so that the wheel can be turned in one direction to drive the shaft and reversely turned independently of the shaft, and releasable means for preventing reverse movement of the shaft except upon release thereof.

5. A riveting mechanism for setting a two-part rivet where one part is pulled and the reaction to the pull is applied against the other part, comprising a casing, a reciprocatory member projecting from the casing, means on the member for engaging the one rivet part so as to pull it, means on the casing for applying the reaction force to the other rivet part, means including a turnable shaft for moving the member, a manually turnable element on the shaft, and means connecting the element to the shaft so that the latter may be turned in the rivet pulling direction by increments through back and forth turning of the element.

6. A riveting mechanism for setting a two-part rivet where one part is pulled and the reaction to the pull is applied against the other part, comprising a casing, a reciprocatory member projecting from the casing, means on the member for engaging the one rivet part so as to pull it, means on the casing for applying the reaction force to the other rivet part, means including a turnable shaft for moving the member, a manually turnable element on the shaft, means connecting the element to the shaft so that the latter may be turned in the rivet pulling direction by increments to set the rivet through back and forth turning of the element, and releasable means on the casing for preventing reverse turning of the shaft during setting of the rivet.

7. A riveting mechanism for setting a two-part rivet wherein one part is pulled and the reaction to the pull is applied against the other part, comprising a casing, a reciprocatory member projecting from the casing, means on the member for engaging the one rivet part so as to pull it, means on the casing for applying the reaction force to the other rivet part, means for moving the reciprocatory member including rack teeth on a portion thereof in the casing, a reduction gear train in the casing and including a pinion meshing with the rack teeth, means for driving the reduction gear train including a shaft projecting to the exterior of the casing, a manually turnable element on the shaft, means connecting the element to the shaft so that the latter may be turned in the rivet pulling direction by increments so as to enable driving the reduction gear train and setting the rivet through back and forth turning of the element, and releasable means on the casing for preventing reverse turning of the shaft during setting of the rivet.

8. A riveting mechanism for setting a two-part rivet wherein one part is pulled and the reaction to the pull is applied against the other part, comprising a casing, a reciprocatory member projecting from the casing, means on the member for engaging the one rivet part so as to pull it, means on the casing for applying the reaction force to the other rivet part, means for moving the reciprocatory member including rack teeth on a portion thereof in the casing, a reduction gear train in the casing and including a pinion meshing with the rack teeth, means for driving the reduction gear train including a shaft projecting to the exterior of the casing, a manually turnable element on the shaft, means connecting the element to the shaft so that the latter may be turned in the rivet pulling direction by increments so as to enable driving the reduction gear train and setting the rivet through back and forth turning of the element, releasable means on the casing for preventing reverse turning of the shaft during setting of the rivet, and spring means opposing movement of the reciprocatory member in its rivet setting direction, whereby when the rivet has been set, the releasable means may be released so as to allow the spring to effect reverse rotation of the reduction gear train and return all the parts to their initial positions.

9. A riveting mechanism for setting a two-part rivet where one part is pulled and the reaction to the pull is applied against the other part, comprising a casing, a reciprocatory member slidable in the casing, means on the member for engaging the one rivet part so as to pull it, means on the casing for applying the reaction force to the other rivet part, means including a turnable shaft for moving the member, a manually turnable element on the shaft, means connecting the element to the shaft so that the latter may be turned by said manually turnable element so as to pull said one rivet part, and releasable means on the casing for preventing reverse turning of the shaft during the pulling of said one rivet part and setting of the rivet.

10. A mechanism for moving a tubular element and a pin element extending through it, comprising a casing, an anvil on the casing for applying the reaction force to the tubular element, means engageable with the pin for pulling it, a rack connected to said means, a pinion engaging the rack, resilient means opposing the rivet pulling movement of the rack, means for turning the pinion including a shaft and a manually engageable element on the shaft located externally of the casing, means connecting the manually engageable element to the shaft so that upon turning it in one direction it drives the shaft to cause the pin element to be pulled and the reaction force to be applied against the tubular element, and releasable means for preventing reverse movement of the shaft except upon release thereof so that during setting of the rivet the shaft will not turn reversely even though the manually turnable element is not manually held against reverse turning.

LOUIS C. HUCK.